(12) United States Patent
Chen et al.

(10) Patent No.: US 10,742,400 B2
(45) Date of Patent: Aug. 11, 2020

(54) DATASTREAM BLOCK ENCRYPTION

(71) Applicant: HEWLETT PACKARD ENTERPRISE DEVELOPMENT LP, Houston, TX (US)

(72) Inventors: Liqun Chen, Bristol (GB); Peter Thomas Camble, Bristol (GB); Michael Wendland, Bristol (GB)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 83 days.

(21) Appl. No.: 15/505,671

(22) PCT Filed: Mar. 20, 2015

(86) PCT No.: PCT/US2015/021632
§ 371 (c)(1),
(2) Date: Feb. 22, 2017

(87) PCT Pub. No.: WO2016/153457
PCT Pub. Date: Sep. 29, 2016

(65) Prior Publication Data
US 2017/0279603 A1 Sep. 28, 2017

(51) Int. Cl.
H04L 9/06 (2006.01)
H04L 9/14 (2006.01)
H04L 29/06 (2006.01)

(52) U.S. Cl.
CPC .............. H04L 9/065 (2013.01); H04L 9/06 (2013.01); H04L 9/0618 (2013.01);
(Continued)

(58) Field of Classification Search
CPC ......... H04L 9/065; H04L 9/06; H04L 9/0618; H04L 9/14; H04L 9/0637; H04L 63/0428; H04L 2209/24
See application file for complete search history.

(56) References Cited

U.S. PATENT DOCUMENTS 4,924,515 A * 5/1990 Matyas ................... H04L 9/088
380/280
6,243,470 B1 * 6/2001 Coppersmith ........ H04L 9/0625
380/259
(Continued)

FOREIGN PATENT DOCUMENTS

CN 1531799 A 9/2004
CN 101061661 A 10/2007
(Continued)

OTHER PUBLICATIONS

Damm et al., "Cryptography" pp. 1-42, Dec. 2013, https://userinformatik.uni-goettingen.de/~brosenne/vortraege/crypto2013ws/05extract_substitution_permutation_networks.pdf (Year: 2013).*
(Continued)

Primary Examiner — Robert B Leung
(74) Attorney, Agent, or Firm — Hewlett Packard Enterprise Patent Department

(57) ABSTRACT

In some examples, a non-transitory machine readable storage medium has machine readable instructions to cause a computer processor to segment a datastream into a plurality of equal length blocks each of which has a fixed length, separately encrypt each equal length block using a first encryption key, swap a subset of bits of a first encrypted equal length block with a subset of bits of a second encrypted equal length block such that both of the blocks each have a length equal to the fixed length, and separately encrypt each block using a second encryption key.

14 Claims, 10 Drawing Sheets

(52) U.S. Cl.
CPC .............. *H04L 9/0637* (2013.01); *H04L 9/14* (2013.01); *H04L 63/0428* (2013.01); *H04L 2209/24* (2013.01)

(56) References Cited

U.S. PATENT DOCUMENTS

| | | | |
|---|---|---|---|
| 8,189,775 B2 | 5/2012 | Ghouti et al. | |
| 8,565,421 B1* | 10/2013 | Bhooma | H04L 9/0631 380/29 |
| 8,687,802 B2 | 4/2014 | Morris et al. | |
| 8,726,037 B2 | 5/2014 | Pean et al. | |
| 2003/0165242 A1 | 9/2003 | Walker | |
| 2004/0131181 A1* | 7/2004 | Rhoads | H04L 9/34 380/37 |
| 2007/0081668 A1 | 4/2007 | McGrew et al. | |
| 2007/0198416 A1* | 8/2007 | Ye | H04N 7/167 705/51 |
| 2008/0187132 A1* | 8/2008 | Sung | H04L 9/0637 380/28 |
| 2010/0115286 A1 | 5/2010 | Hawkes et al. | |
| 2012/0198241 A1 | 8/2012 | O'Hare et al. | |
| 2013/0061039 A1 | 3/2013 | Ellis | |
| 2013/0067211 A1* | 3/2013 | Farrugia | H04L 9/0637 713/150 |
| 2013/0202109 A1* | 8/2013 | Ducharme | H04N 21/23476 380/200 |
| 2013/0279690 A1 | 10/2013 | Durham et al. | |
| 2014/0101445 A1 | 4/2014 | Giladi | |
| 2016/0224795 A1* | 8/2016 | Arnold | G06F 16/22 |

FOREIGN PATENT DOCUMENTS

| | | |
|---|---|---|
| CN | 103563325 A | 2/2014 |
| CN | 104040934 A | 9/2014 |
| TW | 201337632 A | 9/2013 |
| WO | 03/10916 A2 | 2/2003 |
| WO | WO-2005081934 A2 | 9/2005 |

OTHER PUBLICATIONS

Damm etal., "Cryptography" pp. 1-42, Dec. 2013, https://user.informatik.uni-goettingen.de/~brosenne/vortraege/crypto2013ws/05extract_substitution_permutation_networks.pdf (Year: 2013) (Year: 2013).*

A.J. Menezes et al. Handbook of Applied Cryptography. CRC Press, 2001. Chapter 7 (Year: 2001).*

International Search Report and Written Opinion, international Application No. PCT/US2015/021632, dated Dec. 15, 2015, pp. 1-11, KIPO.

Shahram Khazaei, "Neutrality-Based Symmetric Cryptanalysis," 2010, pp. 1-158, Federal Institute of Technology in Lausanne, Switzerland, Available at: <infoscience.epfl.ch/record/148687/files/EPFL_TH4755.pdf>.

Extended European Search Report, EP Application No. 15886621.0, dated Feb. 9, 2018, pp. 1-7, EPO.

* cited by examiner

DATASTREAM BLOCK ENCRYPTION

BACKGROUND

Cryptographic encryption can refer generally to techniques to encode plaintext messages or information into ciphertext such that the content of the plaintext is unreadable or otherwise incoherent to unauthorized entities. Such encryption can, for example, be performed using a public or secret encryption algorithm as well as a secret encryption key to encode and decode the ciphertext. In addition, in some encryption schemes, a random or pseudorandom nonce initialization vector can also be used in order to produce different ciphertexts for identical plaintexts.

BRIEF DESCRIPTION OF THE DRAWINGS

For a detailed description of various examples, reference will now be made to the accompanying drawings in which.

DETAILED DESCRIPTION

Figure 1:
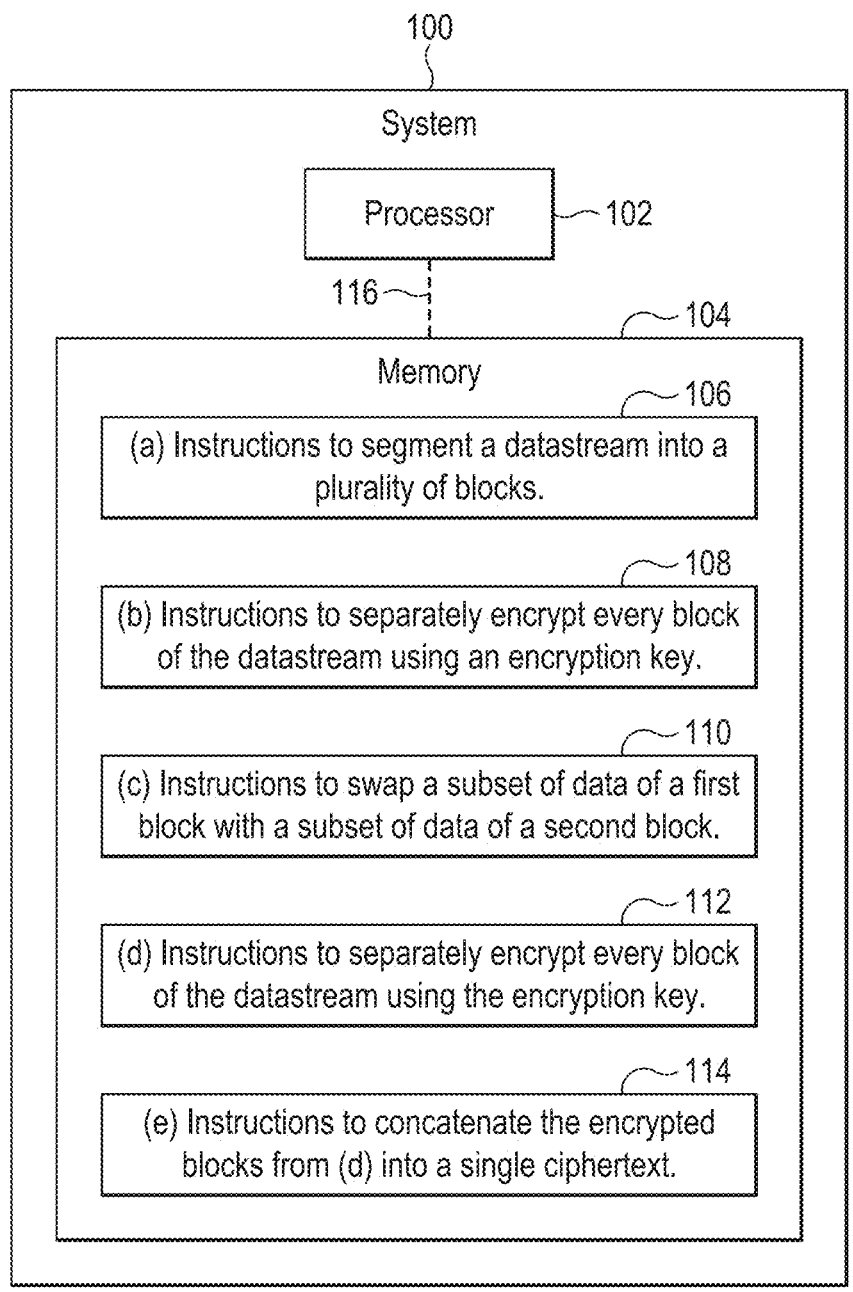
FIG. 1 is a diagram of a system, according to an example.

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on.

As provided above, many encryption schemes rely on the use of a nonce initialization vector to produce different ciphertexts for identical plaintexts. Some encryption schemes, such as the Electronic Code Book (ECB) scheme, do not use initial values at all. However, these schemes often suffer from low security and can leak equality of common parts of distinct plaintexts. That is, it may be possible for a user to tell whether a part of two ciphertexts are encryptions of the same message. Although the use of an initialization vector may provide for improved semantic security, as described herein, in some situations or applications, the use of initialization vectors can be undesirable. For example, such use may be associated with non-trivial communication and storage costs. Moreover, in some cases, the use of such vectors can compromise the security of an encryption scheme if the vectors are not sufficiently unique, random, or kept secret. In addition, in some applications, such as for example deduplication and searchable encryption applications, it may be desirable for an encryption scheme to produce identical ciphertexts for identical plaintexts.

This disclosure describes implementations of improved systems, methods, and mediums for encrypting information that seek to address the above issues. For example, certain implementations of the present disclosure can provide for a deterministic block cipher chaining scheme that avoids disclosing common parts of distinct plaintexts and does not make use of an initial value. One implementation of the present disclosure is directed to an encryption technique that includes separately encrypting equal length blocks of a datastream using an encryption key and without an initialization vector, swapping a subset of data of a first equal length block with a subset of data of a second equal length block such that both swapped blocks have equal lengths, and then separately encrypting both of the swapped blocks using the encryption key. Such a technique can exhibit advantages compared to existing systems, method, and mediums for encrypting information. For example, in certain implementations of the present disclosure, information can be encrypted without relying on an initial value while still providing acceptable security and without leaking equality of common parts of distinct plaintexts. Other advantages of implementations presented herein will be apparent upon review of the description and figures.

FIG. 1 illustrates a diagram of a system 100 that can be used to encrypt information. As described in further detail below, system 100 includes a processor 102 and a memory 104 that stores machine-readable instructions that when executed by processor 102 are to segment a datastream into a plurality of blocks (instructions 106), separately encrypt these blocks using an encryption key (instructions 108), swap a subset of data of a first block with a subset of data of a second block (instructions 110), separately encrypt the blocks using the encryption key (instructions 112), and concatenate the encrypted blocks into a single ciphertext (instructions 114). The various aspects of system 100 including processor 102, memory 104, and instructions 106, 108, 110, 112, and 114 will be described in further detail below.

Instructions 106 stored on memory 104 are to cause processor 102 to segment a datastream into a plurality of blocks. The term "datastream" as used herein can, for example, refer to a plaintext message or information that is readable and meaningful to humans or to a computer. For example, such a datastream can be in the form of a textual message, computer code (e.g., to run a program, produce an image, etc.), or any other suitable information to be communicated between entities. The term "plaintext" as used herein can generally refer to a representation of data before any action has been taken to conceal, compress, or "digest" it. Moreover, it is appreciated that in some implementations, multiple layers of encryption can be used such that the output of one encryption algorithm becomes a datastream input for the next. In such an implementation, the datastream inputted into the encryption algorithm can, for example, be ciphertext from a previous encryption process.

As provided above, instructions 106, when executed by processor 102, segment the datastream into a plurality of blocks. Such instructions can allow the datastream to be encrypted using a block cipher mode of operation that repeatedly applies a block cipher's single-block operation to securely transform a datastream larger than a single block. The term "block" as used herein can, for example, refer to a fixed-length groups of bits for use in a block cipher, such as the Advanced Encryption Standard (AES) block cipher, which has a block size of 128 bits. It is appreciated that AES is merely provided as an example of one of many encryption algorithms suitable for use with the present disclosure and that other algorithms may be used, such as the Triple Data Encryption Standard (TDES) cipher, the International Data Encryption Algorithm (IDEA) cipher, the Blowfish cipher, etc.

In some implementations, instructions 106, when executed by processor 102, are to segment the datastream into a plurality of equal length blocks each of which has a fixed length and a remainder block that has a length greater than zero and smaller than the fixed length. As described below, for example with respect to the example process of FIGS. 5-10, such a segmentation step can be used for a block cipher mode of operation that employs ciphertext stealing to process messages that are not evenly divisible into blocks.

Instructions 108 stored on memory 104, when executed by processor 102, are to cause processor 102 to separately encrypt every block of the datastream using an encryption key. The encryption process performed by instructions 108 can, for example, implement a publicly available encryption algorithm, such as AES, or another suitable encryption algorithm. Generally speaking, the term "encryption key" as used herein can refer to a piece of information that determines a functional output of a cryptographic algorithm. As an example, such an encryption key can be used to control the operation of a cryptographic algorithm so that only the correct key can convert encrypted text to plaintext and vice versa. The encryption key can have a key size suitable for use with the cryptographic algorithm used for encryption. With reference to the AES algorithm of operation as an example, a suitable key size can be 128, 192 or 256 bits, or another suitable key size. As described above, in applications such as deduplication and searchable encryption applications, the use of an initialization vector may not be cryptographically necessary, and in some implementations, instructions 108 are to cause processor 102 to separately encrypt the blocks of the datastream without using an initialization vector. Likewise, in other implementations, instructions 108 are to cause processor 102 to separately encrypt the blocks of the datastream using an initialization vector.

Instructions 110 stored on memory 104, when executed by processor 102, are to cause processor 102 to swap a subset of data of a first block with a subset of data of a second block. For example, in some implementations, the subset of data of the first block and the subset of data of the second block can be the same size, such that after the swapping step, both blocks remain the same size. It is appreciated that any suitable subset of data from each block can be used. As but one example, the subset of data of the first block can be a first half of bits of the first block (e.g., the left-most 64 bits of a 128-bit first block) and the subset of data of the second block can be a second half of bits of the second block (e.g., the right-most 64 bits of a 128-bit second block). As another example, in some implementations, a 64-bit subset of data from a 128-bit block can be formed by a combination of the left-most 32 bits of the block and the right-most 32 bits of the block.

In some implementations, instructions 110, when executed by processor 102, are to cause processor 102 to separately swap subsets of data for each equal length block. For example, a first subset of data of a first block can be swapped with a first subset of data of a second block. Following this step, a second subset of data of the second block can be swapped with a first subset of data of a third block. Following this step, a second subset of data of the third block can be swapped with a first subset of a fourth block, and so on. In some implementations, swapping operations between different pairs (or other combinations of blocks) can be performed concurrently or at any suitable time for example based on processing capabilities of system 100. It is appreciated that modifications can be made to the above implementation. For example, in some implementations, a subset of data can be swapped with a subset of data of a third block and following this step, a subset of data of a second block can be swapped with a subset of data of a fourth block.

In some implementations, the same bits of data for a given block can be "swapped" multiple times via instructions 110 (or a separate set of instructions) to provide additional or alternative security. As an example, a subset of data ("subset X") of a first block can be swapped with a subset of data ("subset Y") of a second block. Following this step, the data of subset X (or a portion thereof) can be swapped with a subset of data from another block. In some implementations, the swapping process performed by instructions 110 can be iterated in order to achieve a desired level of cryptographic security. One example of such an implementation is provided below with respect to FIGS. 5-10, in which a swapping process (e.g., a swapping process performed by instructions 110) is repeated multiple times. Following the swapping process of instructions 110, the data within the blocks of the segmented datastream can be reordered based on the entire datastream rather than based on a pair of blocks.

Instructions 112, when executed by processor 102, are to separately encrypt every block of the datastream using an encryption key. In some implementations, each block can be separately encrypted by a separate encryption key or a common key can be used to separately encrypt each block. It is appreciated that the encryption performed by instructions 108 can incorporate aspects of the encryption performed by instructions 108 and described above. Indeed, in some implementations, instructions 112 are the same set of instructions as instructions 108 and are called multiple times for each iteration of encryption used by system 100. Similar to certain implementations of instructions 108, in some implementations, instructions 112 can rely on the AES block cipher algorithm to separately encrypt every block of the datastream.

In some implementations, the encryption key used by instructions 112 is the same encryption key used by the first encryption process of instructions 108. In some implementations, the encryption key used by instructions 112 is a different encryption key from that used by the first encryption process of instructions 108. In some implementations, the encryption key used by instructions 112 and the encryption key used by instructions 108 are independently and randomly (or pseudorandomly) generated. It is appreciated that in some implementations, different encryption keys can be derived from one another or have some other predictive relationship.

Instructions 114, when executed by processor 102, are to concatenate the encrypted blocks resulting from instructions 112 into a single ciphertext. In some implementations, the ciphertext will have a size that is equal to the original datastream, whereas in other implementations the ciphertext will have a bigger size than the original datastream. For example, in some implementations, instructions 114 may "pad" a ciphertext created by concatenating encrypted blocks so as to achieve a desired ciphertext length. In some implementations, the size or number of encrypted blocks can be changed during the encryption or swapping processes. For example, in some implementations, a 128-bit block size can be "expanded" into a 192-bit block size during an encryption step by including meaningful or nonmeaningful data in each block. Such an expansion can, for example, allow blocks not compatible with a given encryption algorithm to be encrypted using the algorithm. In such an implementation, a ciphertext that results from concatenating encrypted blocks can be larger than its original datastream.

Processor 102 of system 100 can, for example, be in the form of a central processing unit (CPU), a semiconductor-based microprocessor, a digital signal processor (DSP) such as a digital image processing unit, other hardware devices or processing elements suitable to retrieve and execute instructions stored in memory 104, or suitable combinations thereof. Processor 102 can, for example, include single or multiple cores on a chip, multiple cores across multiple chips, multiple cores across multiple devices, or suitable combinations thereof. Processor 102 can be functional to fetch, decode, and execute instructions as described herein. As an alternative or in addition to retrieving and executing instructions, processor 102 can, for example, include at least one integrated circuit (IC), other control logic, other electronic circuits, or suitable combination thereof that include a number of electronic components for performing the functionality of instructions stored on memory 104. Processor 102 can, for example, be implemented across multiple processing units and instructions may be implemented by different processing units in different areas of system 100.

Memory 104 of system 100 can, for example, be in the form of a non-transitory machine-readable storage medium, such as a suitable electronic, magnetic, optical, or other physical storage apparatus to contain or store information such as machine-readable instructions 106, 108, 110, 112, and 114. Such instructions can be operative to perform one or more functions described herein, such as those described herein with respect to the method of FIGS. 5-10 or other methods described herein. Memory 104 can, for example, be housed within the same housing as processor 102 for system 100, such as within a computing tower case for system 100. In some implementations, memory 104 and processor 102 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, memory 104 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that both machine-readable instructions as well as related data can be stored on memory mediums and that multiple mediums can be treated as a single medium for purposes of description.

Memory 104 can be in communication with processor 102 via a communication link 116. Communication link 116 can be local or remote to a machine (e.g., a computing device) associated with processor 102. Examples of a local communication link 116 can include an electronic bus internal to a machine (e.g., a computing device) where memory 104 is one of volatile, non-volatile, fixed, and/or removable storage medium in communication with processor 102 via the electronic bus.

In some implementations, one or more aspects of system 100 can be in the form of functional modules that can, for example, be operative to execute one or more processes of instructions 106, 108, 110, 112, or 114 or other functions described herein relating to other implementations of the disclosure. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or hardware and software hosted at hardware. It is further appreciated that the term "module" is additionally intended to refer to one or more modules or a combination of modules. Each module of a system 100 can, for example, include one or more machine-readable storage mediums and one or more computer processors.

In view of the above, it is appreciated that the various instructions of system 100 described above can correspond to separate and/or combined functional modules. For example, instructions 106 can correspond to a "segmentation module" to segment a datastream into a plurality of blocks, instructions 108 can correspond to an "encryption module" to separately encrypt every block of the datastream using an encryption key, instructions 110 can correspond to a "swapping module" to swap a subset of data of a first block with a subset of data of a second block, instructions 112 can be performed by the above encryption module or by a second encryption module, and instructions 114 can correspond to a "concatenation module" to concatenate encrypted blocks into a single ciphertext. It is further appreciated that a given module can be used for multiple related functions. As but one example, in some implementations, a single module can be used to both segment the datastream into a plurality of blocks (e.g., corresponding to the process of instructions 106) as well as to concatenate encrypted blocks into a single ciphertext (corresponding to the process of instructions 114).

Figure 2:
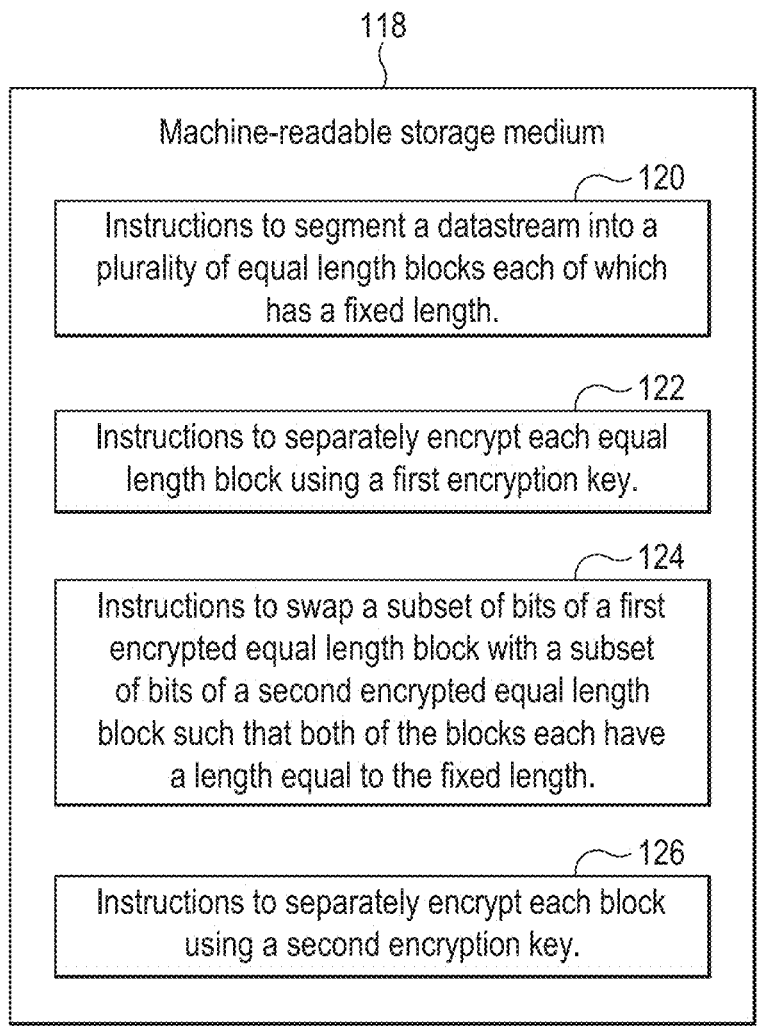
FIG. 2 is a diagram of a machine-readable storage medium, according to an example.

FIG. 2 illustrates a machine-readable storage medium 118 including various instructions that can be executed by a processor to encrypt a datastream. For illustration, the description of machine-readable storage medium 118 provided herein makes reference to various aspects of system 100 (e.g., processor 102) and other implementations of the disclosure. Although one or more aspects of system 100 (as well as its corresponding instructions 106, 108, 110, 112, and 114) can be applied or otherwise incorporated with medium 118, it is appreciated that in some implementations, medium 118 may be stored or housed separately from such a system. For example, in some implementations, medium 118 can be in the form of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof.

Medium 118 includes machine-readable instructions 120 stored thereon to cause processor 102 to segment a datastream into a plurality of equal length blocks each of which has a fixed length. Instructions 120 of medium 118 can incorporate one or more aspects of instructions 106 described above with respect to system 100 and vice versa.

As but one example, in some implementations, instructions 120 are to segment the datastream into a plurality of equal length blocks each of which has a fixed length and a remainder block that has a length greater than zero and smaller than the fixed length.

Medium 118 includes machine-readable instructions 122 stored thereon to cause processor 102 to separately encrypt each equal length block using an encryption key. Instructions 122 of medium 118 can incorporate one or more aspects of instructions 108 and 112 described above with respect to system 100 and vice versa. As but one example, in some implementations, instructions 122 can implement a known encryption algorithm such as AES or another suitable encryption algorithm to separately encrypt each equal length block.

Medium 118 includes machine-readable instructions 124 stored thereon to cause processor 102 to swap a subset of bits of a first encrypted equal length block with a subset of bits of a second encrypted equal length block such that both of the blocks each have a length equal to the fixed length. Instructions 124 of medium 118 can incorporate one or more aspects of instructions 110 described above with respect to system 100 and vice versa. For example, any suitable subset of bits from each block can be used. As but one example, the subset of bits of the first block can be a first half of bits of the first block (e.g., the left-most 64 bits of a 128-bit first block) and the subset of bits of the second block can be a second half of bits of the second block (e.g., the right-most 64 bits of a 128-bit second block).

Medium 118 includes machine-readable instructions 126 stored thereon to cause processor 102 to separately encrypt each block using an encryption key. Instructions 126 of medium 118 can incorporate one or more aspects of instructions 108 and 112 described above with respect to system 100 and/or instructions 122 of medium 118, and vice versa. As but one example, in some implementations, the encryption key used by instructions 126 can be the same encryption key previously used by medium 118 (e.g., the encryption key used in instructions 122).

Figure 3:
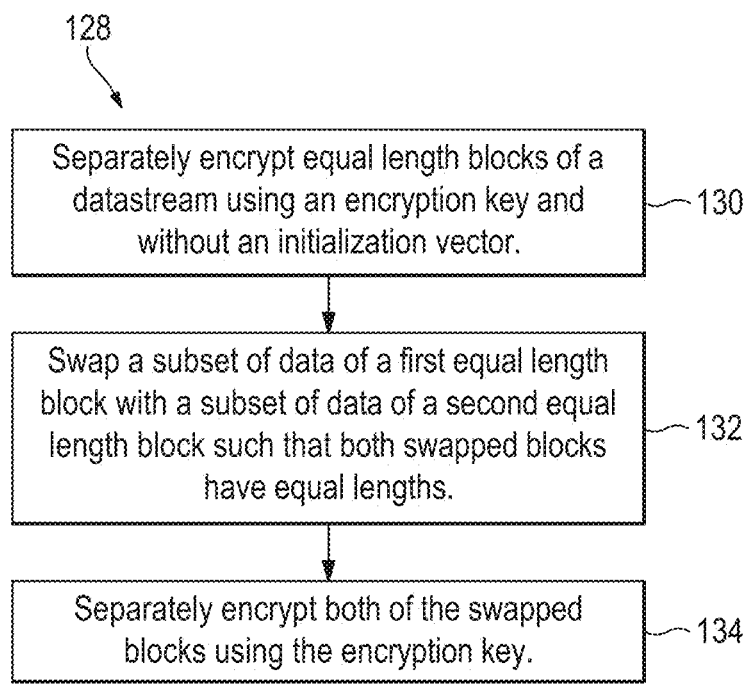
FIG. 3 is a flowchart for a method, according to an example.

FIG. 3 is a flowchart for a method 128 to encrypt a datastream. Although execution of method 128 and other methods described herein make reference to system 100, medium 118, and other aspects of the disclosure described above, other suitable devices for execution of these methods will be apparent to those of skill in the art. Method 128 illustrated in the flowchart of FIG. 3 as well as the methods described in the other figures can, for example, be implemented in the form of executable instructions stored on memory 104 of system 100, executable instructions stored on medium 118, in the form of electronic circuitry, or another suitable form.

Method 128 includes a step 130 of separately encrypting equal length blocks of a datastream using an encryption key and without an initialization vector. Step 130 can incorporate one or more aspects of instructions 108 or another suitable aspect of system 100 and/or instructions 122 or another suitable aspect medium 118 described above (and vice versa). As but one example, in some implementations, step 130 includes segmenting the datastream into a plurality of equal length blocks each of which has a fixed length and a remainder block that has a length greater than zero and smaller than the fixed length.

Method 128 includes a step 132 of swapping a subset of data of a first equal length block with a subset of data of a second equal length block such that both swapped blocks have equal lengths. Step 132 can incorporate one or more aspects of instructions 110 or another suitable aspect of system 100 and/or instructions 124 or another suitable aspect of medium 118 described above (and vice versa). For example, any suitable subset of bits from each block can be used during the swapping process. As but one example, the subset of bits of the first block can be a first half of bits of the first block (e.g., the left-most 64 bits of a 128-bit first block) and the subset of bits of the second block can be a second half of bits of the second block (e.g., the right-most 64 bits of a 128-bit second block).

Method 128 includes a step 134 of separately encrypting both of the swapped blocks from step 132 using the encryption key. Step 134 can incorporate one or more aspects of instructions 112 or another suitable aspect of system 100 and/or instructions 122 or another suitable aspect medium 118 described above (and vice versa). As but one example, in some implementations, the encryption of step 134 can implement a known encryption algorithm such as AES or another suitable encryption algorithm to separately encrypt the swapped blocks.

Figure 4:
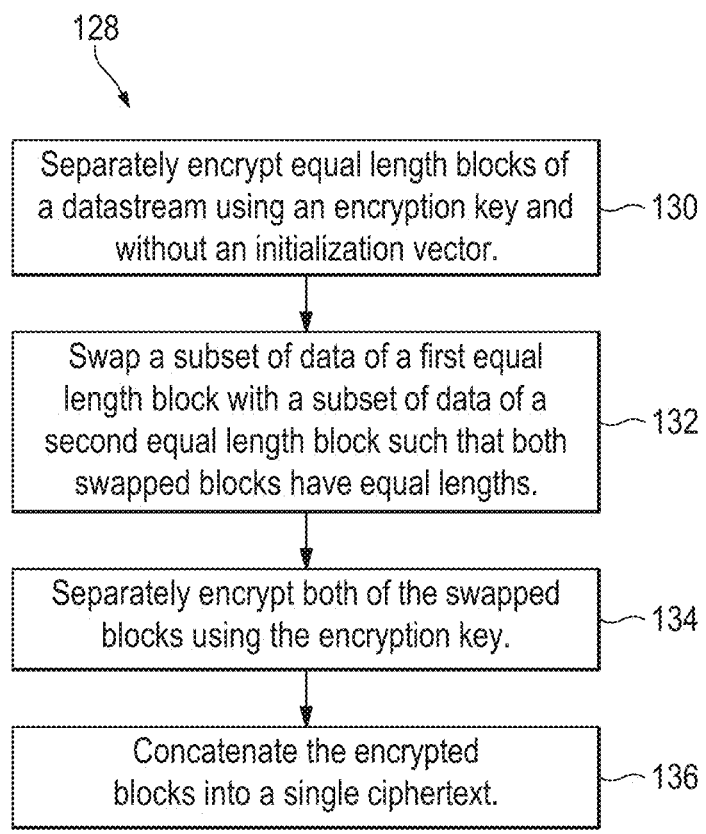
FIG. 4 is a flowchart for a method, according to another example.

FIG. 4 illustrates another example of method 128 in accordance with the present disclosure. Method 128 includes an additional step 136 of concatenating the encrypted blocks following the encryption of step 134 into a single ciphertext. Step 136 can incorporate one or more aspects of instructions 114 or another suitable aspect of system 100 (and vice versa). As but one example, in some implementations, the concatenated ciphertext can have a size that is equal to the original datastream, whereas in other implementations the ciphertext will have a bigger size than the original datastream.

FIGS. 5-10 illustrate various steps of an example encryption process in accordance with the present disclosure. The encryption process of FIGS. 5-10 can, for example, be implemented in the form of executable instructions stored on memory 104 of system 100, executable instructions stored on medium 118, in the form of electronic circuitry, or another suitable form. The encryption process of FIGS. 5-10 begins with a datastream A already segmented into blocks of 50 characters (e.g., A1, A2, A3, A4, and A5) with a block at the end of the datastream (A6) for the remainder of the datastream and includes only 20 characters. It is appreciated that such segmentation can, for example, be performed as described above with respect to instructions 106 and/or instructions 120. The term "characters" used with respect to the description of this example is provided for illustration only. Indeed, it is appreciated that implementations of the present disclosure may operate at the bit-level or another suitable level for processing the datastream.

Figure 5:
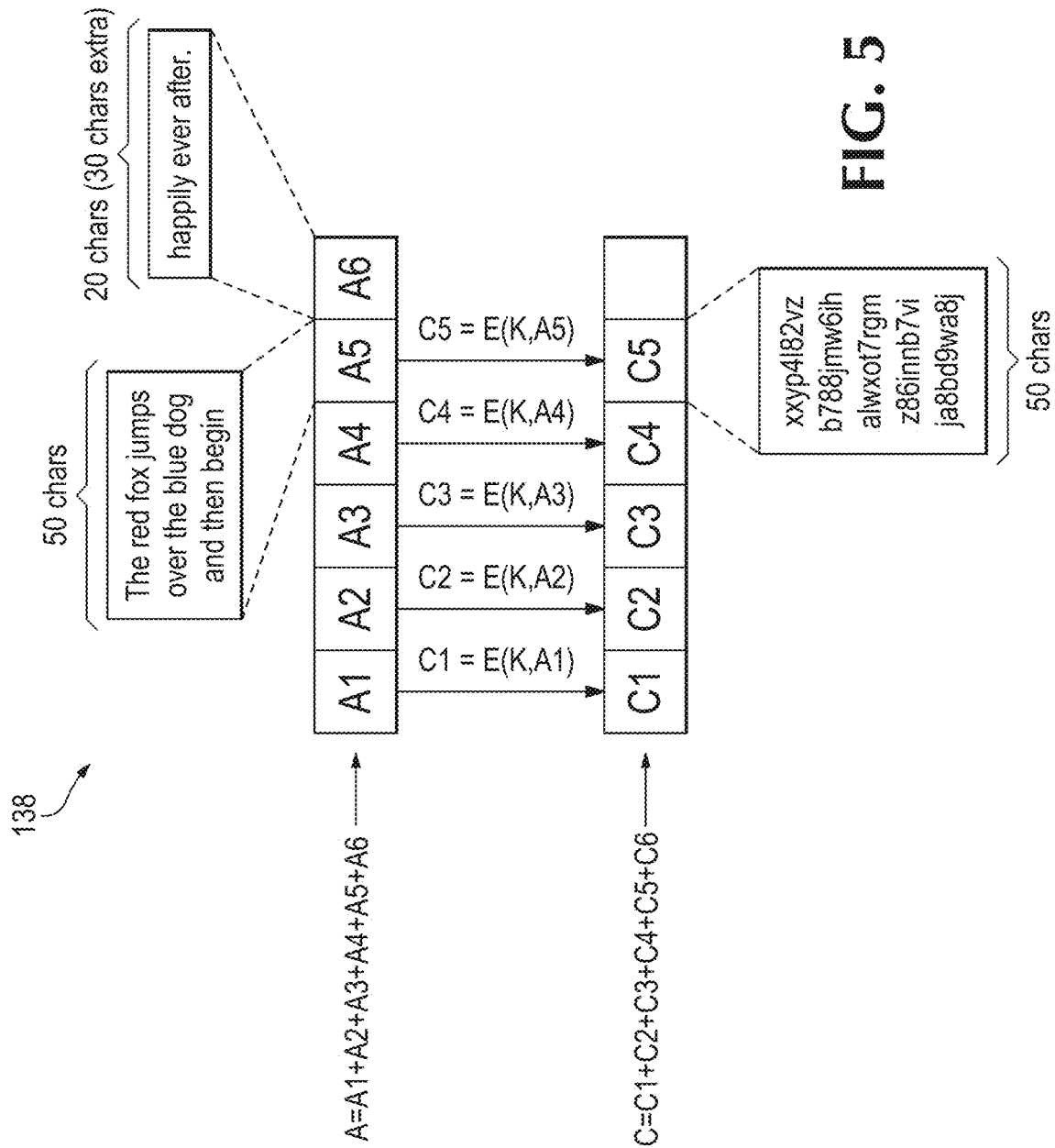
FIG. 5 illustrates a step of a method, according to another example.

FIG. 5 illustrates a step 138 of the example encryption process that can, for example, correspond to one or more aspects of the encryption instructions 108 for system 100, instructions 122 of medium 118, and/or step 130 of method 128. As illustrated in FIG. 5, each block of datastream A can be encrypted using an encryption algorithm E and respective encryption key K to achieve a respective encrypted ciphertext C formed by respective encrypted blocks C1, C2, C3, C4, and C5. For purposes of illustration, each datastream block is encrypted using the same encryption algorithm E and the same encryption key K. However, it is appreciated that different encryption algorithms and/or encryption keys may be used for different blocks.

Figure 6:
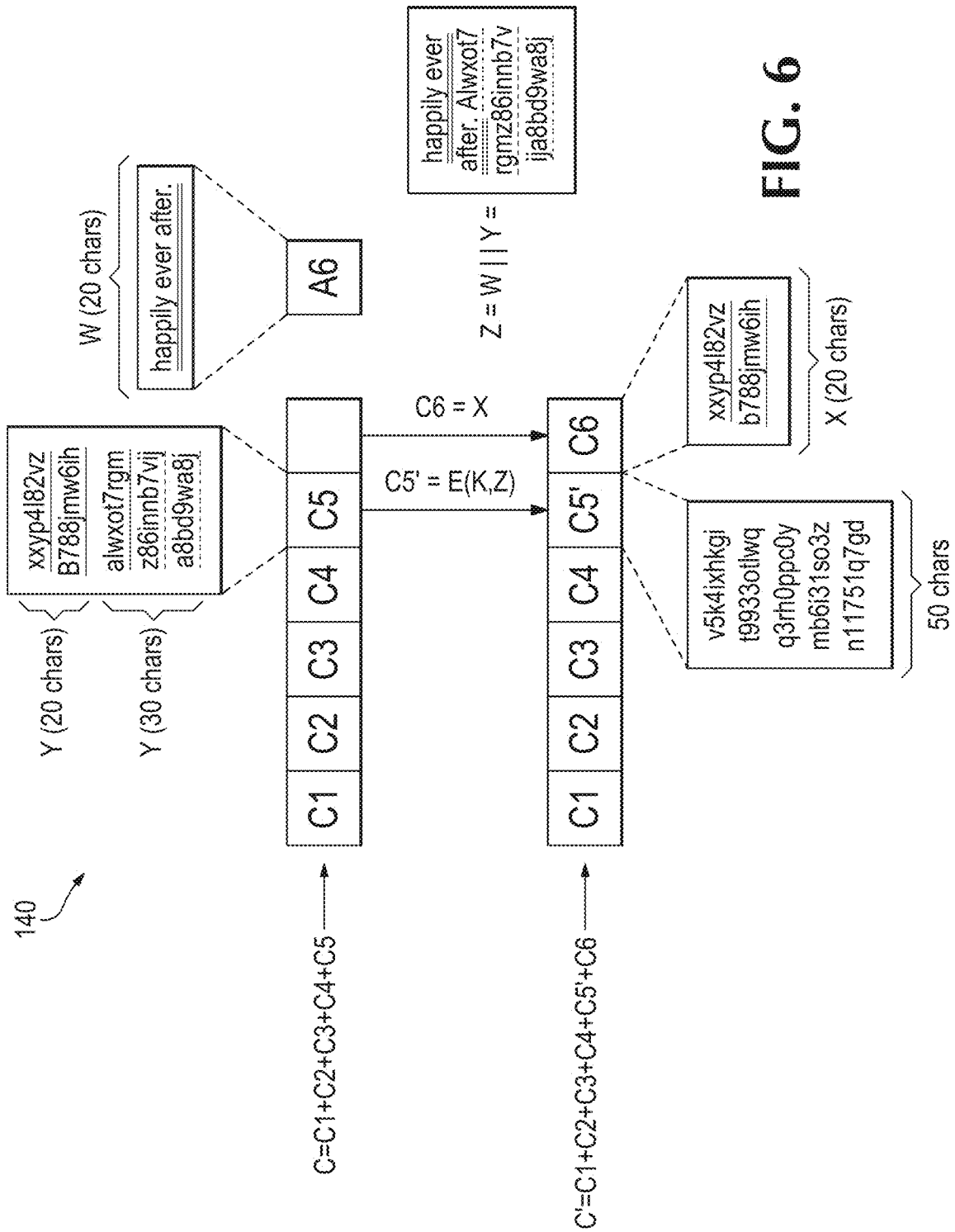
FIG. 6 illustrates another step of a method, according to the example of FIG. 5.

FIG. 6 illustrates a step 140 in the example encryption process that can, for example, implement one or more aspects of a ciphertext stealing operation for use with a block cipher to process messages that are not evenly divisible into blocks. In this step, an encrypted block C5 of ciphertext C resulting from step 138 is split into a first portion of data X that is equal in size (20 characters) to the data W in the remainder block A6 of datastream A and a second portion of data Y (30 characters) for the remainder of data from block C5. Data W is combined with data Y to form data Z, which is encrypted using encryption algorithm E and encryption key K to form modified ciphertext block C5'. Data X is stored in ciphertext block C6. At this stage in the process, each block of ciphertext C includes data that has been encrypted at least once using encryption algorithm E. It is appreciated that modifications can be made to above description of step 140 to achieve similar functionality— e.g., to add an appropriate amount of data to a block such that a fixed-size block encryption operation can be performed on the data. For example, as described above, data Y is the right-most 30 characters of block C5. However, it is appreciated that in some implementations, data Y may be the left-most 30 characters of block C5. Similarly, data Z is formed by adding data Y to data W, however it is appreciated that in some implementations, data Z may be formed by adding data W to data Y or that data Y may be added to data W in multiple pieces or vice versa. Moreover, in some implementations, random data (e.g., data not from any other block of datastream A or ciphertext C can be added to block A6 such that block A6 is a suitable size to allow encryption by encryption algorithm E.

Figure 7:
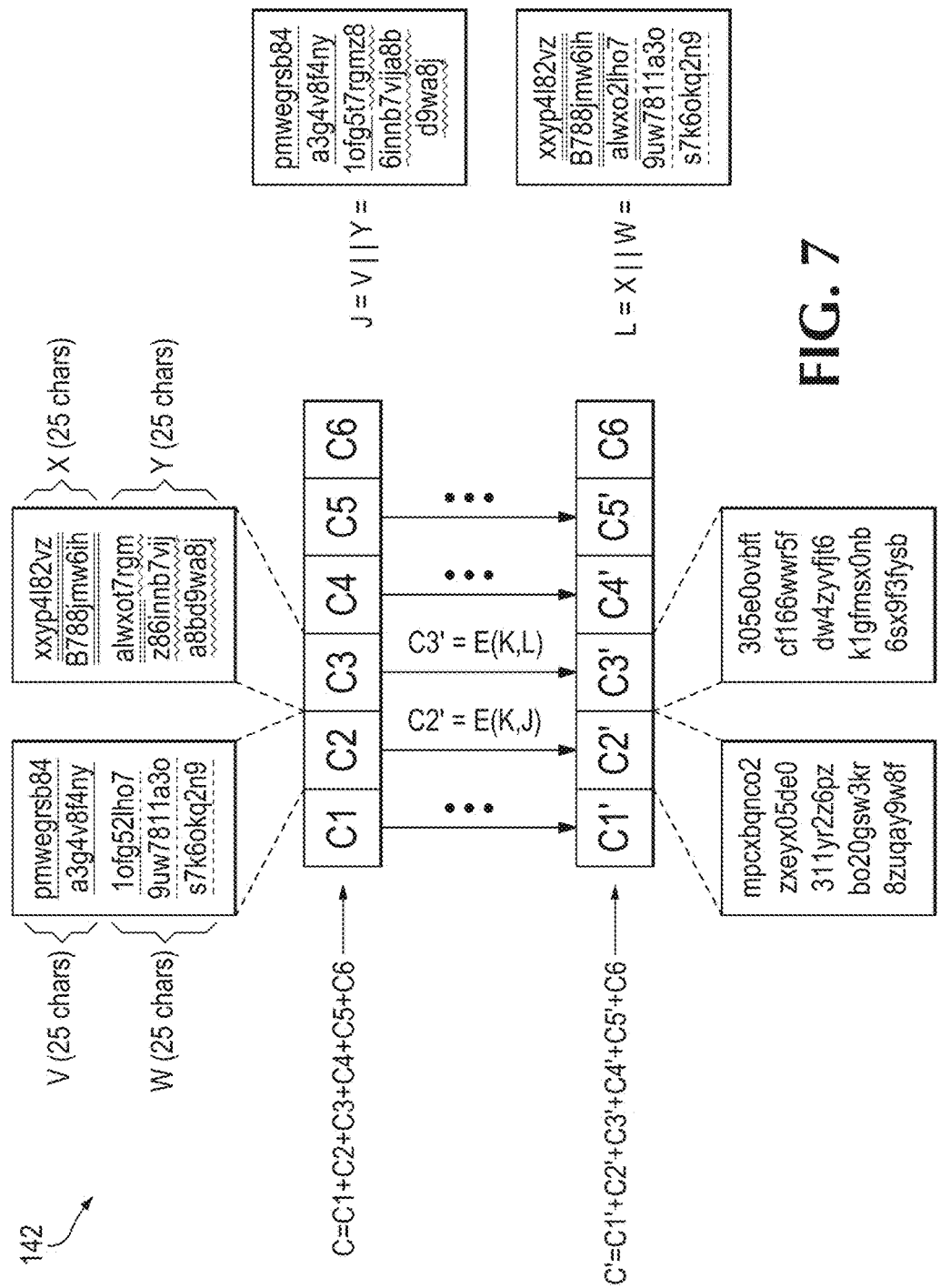
FIG. 7 illustrates another step of a method, according to the example of FIG. 5.

FIG. 7 illustrates a step 142 in the example encryption process that can, for example, correspond to one or more aspects of instructions 110 system 100, instructions 124 of medium 118, and/or step 132 of method 128. As illustrated in FIG. 7, a first block C2 of ciphertext C resulting from step 140 (which may or may not be the first sequential block of ciphertext C) is split into a first portion of data V (25 characters) and a second portion of data W (25 characters). Likewise, a second block C3 of ciphertext C resulting from step 140 (which may or may not be the next sequential block following block C2) is split into a first portion of data X (25 characters) and a second portion of data Y (25 characters). For purposes of illustration, the same reference letters for portions of data (e.g., V, W, X, and Y) are used for convenience in the description of various steps of the example encryption process of FIGS. 5-10. However, it should be apparent from FIGS. 5-10 that the reference letters are not necessarily intended to refer to the same data between different steps of the example encryption process. That is, data W referred to in step 142 is not necessarily the same data W referred to in step 140. As illustrated in FIG. 7, data V is combined with data Y to form data J, which is encrypted using encryption algorithm E and encryption key K to form modified ciphertext block C2'. Likewise, data X is combined with data W to form data L, which is encrypted using encryption algorithm E and encryption key K to form modified ciphertext block C3'. Although FIG. 7 illustrates only a single data swapping operation between ciphertext blocks C2 and C3 to form modified ciphertext blocks C2' and C3', the example encryption process is used in this step to form modified ciphertext blocks C1', C4', and C5' using similar operations. In this example process, data from ciphertext block C6 (which was created in step 140 described above) is not swapped with data from another block. However, it is appreciated that suitable modifications may be made to step 142 to provide a swapping operation for block C6.

Figure 8:
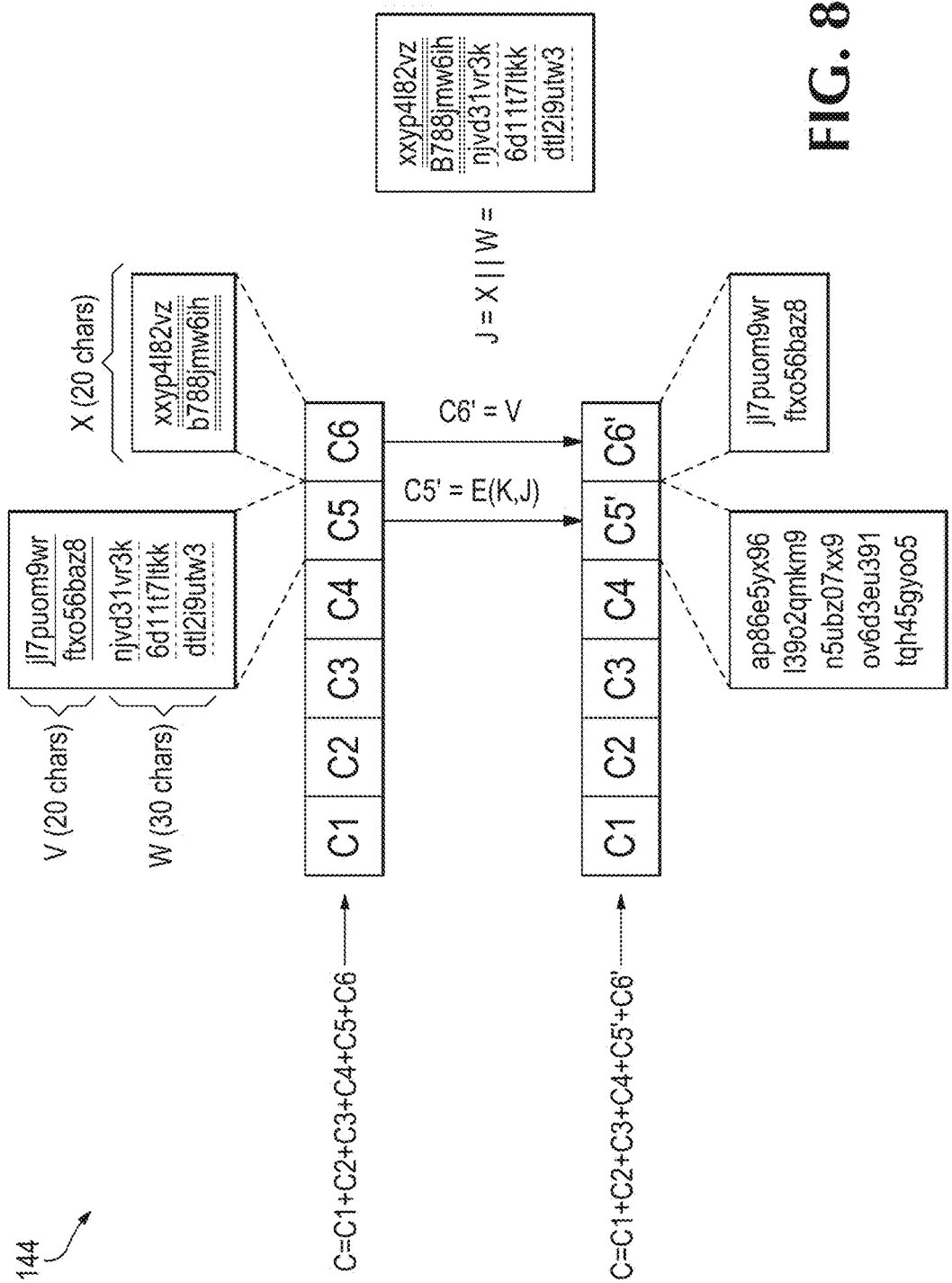
FIG. 8 illustrates another step of a method, according to the example of FIG. 5.

FIG. 8 illustrates a step 144 in the example encryption process that can, for example, implement one or more aspects of a ciphertext stealing operation similar to that described above with respect to step 140. In this step, an encrypted block C5 of ciphertext C resulting from step 142 is split into a first portion of data V that is equal in size (20 characters) to the data X in the remainder block C6 of ciphertext C and a second portion of data W (30 characters) for the remainder of data from block C5. Data X is combined with data W to form data J, which is encrypted using encryption algorithm E and encryption key K to form modified ciphertext block C5'. Data V is stored in modified ciphertext block C6'. As described above with respect to step 138, it is appreciated that modifications can be made to exact description of step 144 to achieve similar functionality—i.e., to add an appropriate amount of data to a block such that a fixed-size block encryption operation can be performed on the data.

Figure 9:
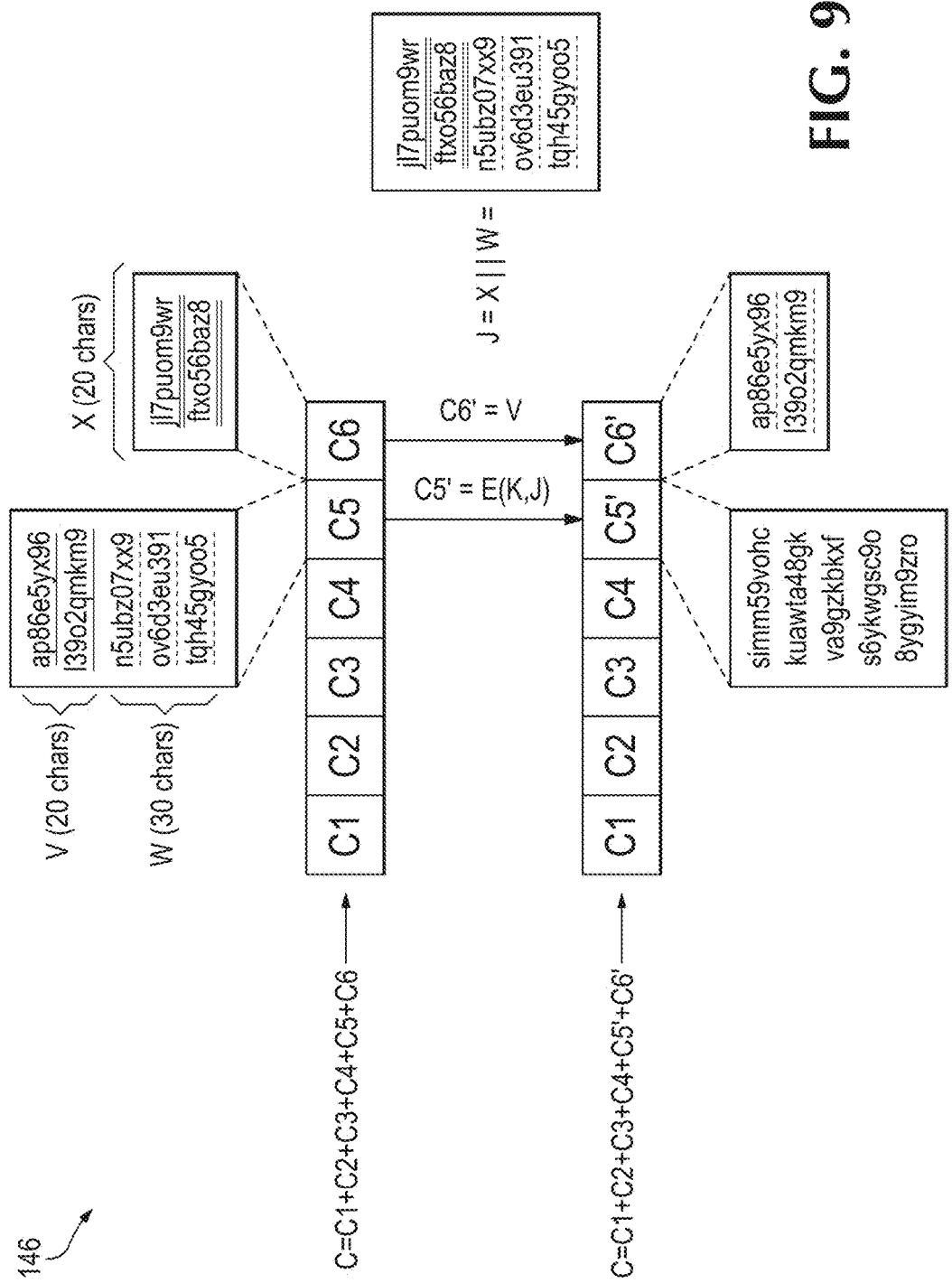
FIG. 9 illustrates another step of a method, according to the example of FIG. 5.

FIG. 9 illustrates a step 146 in the example encryption process that can, for example, correspond to a second iteration of step 144 to further encrypt ciphertext C. That is, an encrypted block C5 of ciphertext C resulting from step 144 is split into a first portion of data V that is equal in size (20 characters) to the data X in the remainder block C6 of ciphertext C and a second portion of data W (30 characters) for the remainder of data from block C5. Data X is combined with data W to form data J, which is encrypted using encryption algorithm E and encryption key K to form modified ciphertext block C5'. Data V is stored in modified ciphertext block C6'. As described above with respect to step 144, it is appreciated that modifications can be made to exact description of step 146 to achieve similar functionality.

Figure 10:
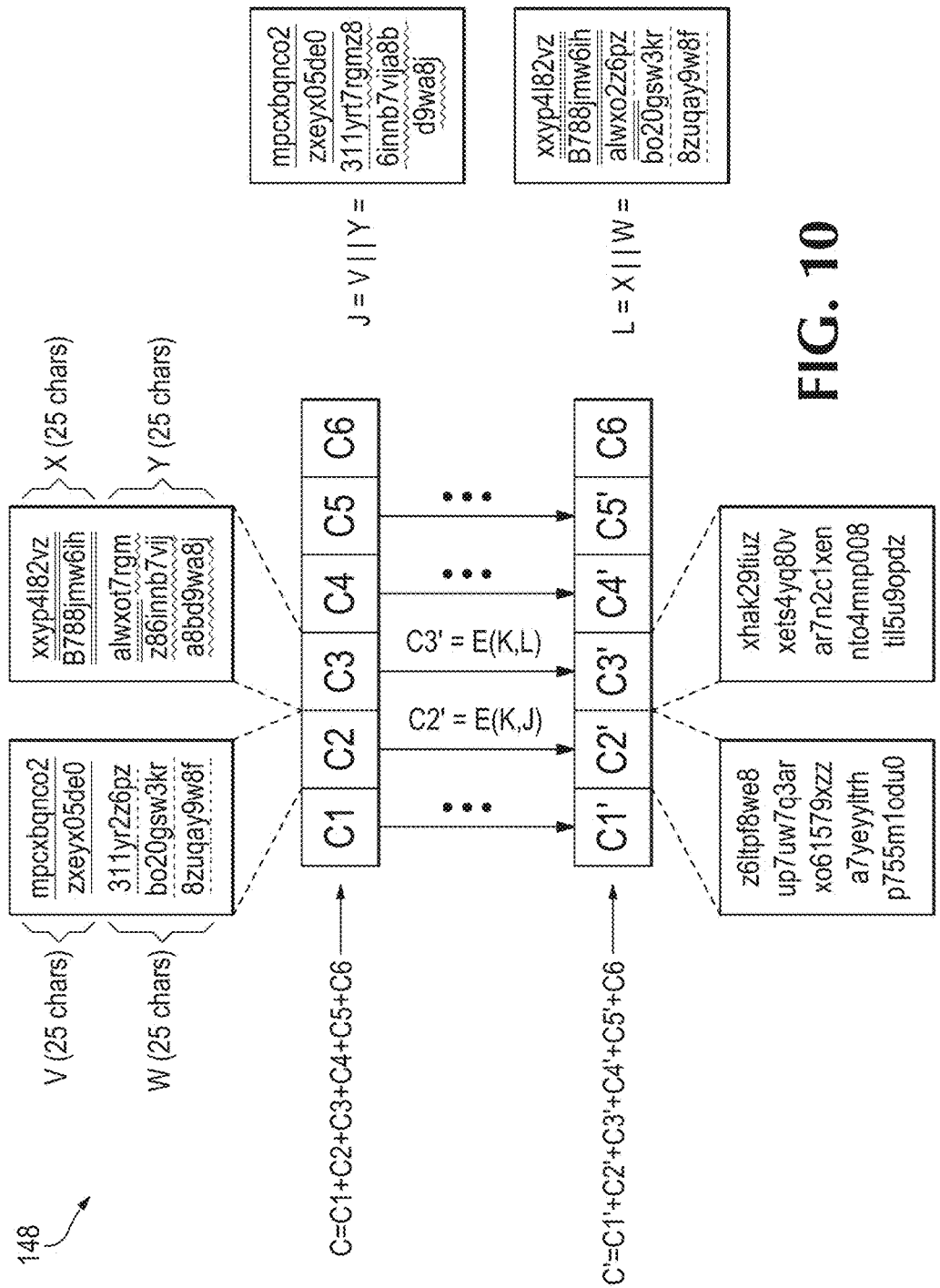
FIG. 10 illustrates another step of a method, according to the example of FIG. 5.

FIG. 10 illustrates a step 148 in the example encryption process that can, for example, correspond to a second iteration of step 142 to further encrypt ciphertext C. That is, a first block C2 of ciphertext C resulting from step 146 (which may or may not be the first sequential block of ciphertext C) is split into a first portion of data V (25 characters) and a second portion of data W (25 characters). Likewise, a second block C3 of ciphertext C resulting from step 146 (which may or may not be the next sequential block following block C2) is split into a first portion of data X (25 characters) and a second portion of data Y (25 characters). As illustrated in FIG. 10, data V is combined with data Y to form data J, which is encrypted using encryption algorithm E and encryption key K to form modified ciphertext block C2'. Likewise, data X is combined with data W to form data L, which is encrypted using encryption algorithm E and encryption key K to form modified ciphertext block C3'. As described above with respect to step 142, although FIG. 10 illustrates only a single data swapping operation between ciphertext blocks C2 and C3 to form modified ciphertext blocks C2' and C3', the example encryption process is used in this step to form modified ciphertext blocks C1', C4', and C5' using similar operations.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

As used herein, "logic" is an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

What is claimed is:

1. A non-transitory machine readable storage medium having stored thereon machine readable instructions to cause a computer processor to:
   (a) segment a datastream into a plurality of equal length blocks, wherein each equal length block of the plurality of equal length blocks has a fixed length, the plurality of equal length blocks has an associated remainder block, the remainder block has having a length, and the length of the remainder block is greater than zero and is smaller than the fixed length;
   (b) separately encrypt each equal length block of the plurality of equal length blocks using a first encryption key to generate a first plurality of encrypted equal length blocks;
   (c) swap a subset of bits of a first encrypted equal length block of the first plurality of encrypted equal length blocks with a subset of bits of a second encrypted equal length block of the first plurality of encrypted equal length blocks such that the first encrypted equal length block and the second encrypted equal length block each has a length equal to the fixed length; and
   (d) separately encrypt each encrypted equal length block of the first plurality of encrypted equal length blocks after the swapping using a second encryption key that is different from the first encryption key to generate a second plurality of encrypted equal length blocks,
   (e) swap bits of the remainder block with an equal length of encrypted bits from a predetermined equal length block;
   (f) encrypt the predetermined equal length block using a third encryption key.

2. The medium of claim 1, wherein the instructions are to further cause the computer processor to perform the encryption of steps (b) and (d) without using an initialization vector.

3. The medium of claim 1, wherein the instructions are to further cause the computer processor to perform the encryption of steps (b) and (d) using an Advanced Encryption Standard (AES) encryption method.

4. The medium of claim 1, wherein the instructions are to further cause the computer processor to perform the swapping of step (c) such that the subset of bits of the first encrypted equal length block is a first half of the bits of the first encrypted equal length block and the subset of bits of the second encrypted equal length block is a second half of the bits of the second encrypted equal length block.

5. The medium of claim 1, wherein the instructions are to further cause the computer processor to:
   (g) following step (d), swap a subset of bits of a first encrypted equal length block of the second plurality of encrypted equal length blocks with a subset of bits of a second encrypted equal length block of the second plurality of encrypted equal length blocks such that the first encrypted equal length block and the second encrypted equal length block each has a length equal to the fixed length after the swapping; and
   (h) separately encrypt the first encrypted equal length block and the second encrypted equal length block of step (g).

6. The medium of claim 5, wherein the first encryption key, the second encryption key, and the third encryption key are different.

7. The medium of claim 1, wherein the instructions are to further cause the computer processor to separately perform the swapping of step (c) for each-block of the first plurality of encrypted equal length blocks.

8. The medium of claim 1, wherein the instructions are to cause the computer processor to perform step (e) and (f) after performing step (b) and before performing step (c).

9. The medium of claim 1, wherein the instructions are to cause the computer processor to perform the operations of step (e) and (f) after performing step (d).

10. A method comprising:
    segmenting a datastream into a plurality of equal length blocks, wherein each equal length block of the plurality of equal length blocks has a fixed length, the plurality of equal length blocks has an associated remainder block, the remainder block has a length, and the length of the remainder block is greater than zero and is smaller than the fixed length;
    separately encrypting each equal length block of the plurality of equal length blocks using a first encryption key to generate a first plurality of encrypted equal length blocks;
    swapping a subset of bits of a first encrypted equal length block of the first plurality of encrypted equal length blocks with a subset of bits of a second encrypted equal length block of the first plurality of encrypted equal length blocks such that the first encrypted equal length block and the second encrypted equal length block each has a length equal to the fixed length;
    separately encrypting each block of the first plurality of encrypted equal length blocks after the swapping using a second encryption key to generate a second plurality of encrypted equal length blocks;
    swapping bits of the remainder block with an equal length of encrypted bits from a predetermined equal length block; and
    encrypting the predetermined equal length block using a third encryption key.

11. The method of claim 10, further comprising:
    performing the separately encrypting the each equal length block of the plurality of equal length blocks without using an initialization vector.

12. The method of claim 10, wherein the first encryption key, the second encryption key, and the third encryption key comprise three different encryption key.

13. A system comprising:
    a processor; and
    a memory storing machine readable instructions to cause the processor to:
    (a) segment a datastream into a plurality of equal length blocks, wherein each equal length block of the plurality of equal length blocks has a fixed length, the plurality of equal length blocks is associated with a remainder block, the remainder block has a length, and the length of the remainder block is greater than zero and is smaller than the fixed length;
    (b) swap bits of the remainder block with an equal length set of encrypted bits from a predetermined equal length block;

(c) encrypt the plurality of equal length blocks using an encryption key to provide a first plurality of encrypted equal length blocks;

(d) swap a subset of data of a first encrypted equal length block of the first plurality of encrypted equal length blocks with a subset of data of a second encrypted equal length block of the first plurality of encrypted equal length blocks;

(e) encrypt the first plurality of encrypted equal length blocks after the swapping using the encryption key to generate a second plurality of encrypted equal length blocks; and (f) concatenate the second plurality of encrypted equal length blocks into a single ciphertext.

14. The system of claim 13, wherein the encryption of the plurality of equal length blocks does not use an initialization vector.

* * * * *